US009879855B2

(12) United States Patent
Rivera Garza (10) Patent No.: US 9,879,855 B2
(45) Date of Patent: Jan. 30, 2018

(54) GASEOUS FUEL BURNER WITH HIGH ENERGY AND COMBUSTION EFFICIENCY, LOW POLLUTANT EMISSION AND INCREASED HEAT TRANSFER

(71) Applicant: Jorge Rivera Garza, Nuevo Leon (MX)

(72) Inventor: Jorge Rivera Garza, Nuevo Leon (MX)

( * ) Notice: Subject to any disclaimer, the term of this patent is extended or adjusted under 35 U.S.C. 154(b) by 615 days.

(21) Appl. No.: 14/406,478

(22) PCT Filed: May 14, 2013

(86) PCT No.: PCT/MX2013/000061
§ 371 (c)(1),
(2) Date: Dec. 8, 2014

(87) PCT Pub. No.: WO2013/183981
PCT Pub. Date: Dec. 12, 2013

(65) Prior Publication Data
US 2015/0153040 A1 Jun. 4, 2015

(30) Foreign Application Priority Data

Jun. 8, 2012 (MX) .................... MX/a/2012/006599

(51) Int. Cl.
*F23D 14/02* (2006.01)
*F23D 14/70* (2006.01)
(Continued)

(52) U.S. Cl.
CPC ............ *F23D 14/02* (2013.01); *F23D 14/22* (2013.01); *F23D 14/58* (2013.01); *F23D 14/62* (2013.01);
(Continued)

(58) Field of Classification Search
CPC ........ F23C 2201/20; F23C 2900/03005; F23C 2900/06041; F23D 14/02; F23D 14/22;
(Continued)

(56) References Cited

U.S. PATENT DOCUMENTS 2,806,517 A * 9/1957 Te Nuyl .................... F23C 3/00
110/260
3,244,219 A 4/1966 Nesbitt
(Continued)

FOREIGN PATENT DOCUMENTS

EP 0737837 10/1996
EP 1826485 A2 * 8/2007 ............. F23D 14/02
(Continued)

OTHER PUBLICATIONS

Written Opinion of Mexico Application No. PCT/MX2013/000061 dated Sep. 4, 2013—6 pages.
(Continued)

*Primary Examiner* — Kenneth Rinehart
*Assistant Examiner* — Logan Jones
(74) *Attorney, Agent, or Firm* — K&L Gates LLP (57) ABSTRACT

The invention relates to a gaseous fuel (including all mixtures thereof) burner structure, characterized in that it comprises: a housing defining a distal flame outlet end and a proximal gaseous fuel and air supply end, both ends having covers; a pressurized-air inlet arranged in the housing close to the proximal end, defining an inner pressurized-air-supply chamber; a pressurized-gaseous-fuel-supply duct arranged in the center, housed in a first mixing chamber and provided with a plurality of openings for the outflow of the gaseous fuel to said first mixing chamber, said first mixing chamber also comprising a plurality of openings for supplying pressurized air axially and radially; an igniter arranged inside said first mixing chamber for a first combustion; a second, (Continued)

over-mixing chamber arranged colinearly with said first chamber, the end of the fuel duct comprising a cover provided with openings via which gaseous fuel is axially supplied to said second, over-mixing chamber, and the wall of said second chamber comprising openings via which pressurized air is radially supplied, where a second stage of the combustion process is carried out; and a third, conical flame-formation chamber colinearly connected to the end of said second, over-mixing chamber.

12 Claims, 6 Drawing Sheets

(51) Int. Cl.
*F23D 14/22* (2006.01)
*F23D 14/62* (2006.01)
*F23D 14/58* (2006.01)

(52) U.S. Cl.
CPC .......... *F23D 14/70* (2013.01); *F23C 2201/20* (2013.01); *F23C 2900/03005* (2013.01); *F23C 2900/06041* (2013.01); *F23D 2203/102* (2013.01)

(58) Field of Classification Search
CPC .......... F23D 14/58; F23D 14/62; F23D 14/70; F23D 2203/102
See application file for complete search history.

(56) References Cited

U.S. PATENT DOCUMENTS

| | | | | |
|---|---|---|---|---|
| 3,861,858 A * | 1/1975 | Hemsath | ................ | F23D 14/22 239/425 |
| 3,947,233 A * | 3/1976 | Sundberg | ................ | F23D 14/02 431/328 |
| 3,951,584 A | 4/1976 | Thekdi | | |
| 4,030,875 A * | 6/1977 | Grondahl | ................ | F23C 3/00 60/753 |
| 4,571,938 A * | 2/1986 | Sakurai | ................ | F01N 3/0222 55/466 |
| 4,671,192 A * | 6/1987 | Hoffert | ................ | F02C 3/26 110/214 |
| 4,752,213 A * | 6/1988 | Grochowski | ........... | F23D 14/02 431/328 |
| 4,987,738 A * | 1/1991 | Lopez-Crevillen | ..... | F01N 3/025 60/286 |
| 4,993,939 A * | 2/1991 | Fukuda | ................ | F23D 14/24 431/116 |
| 5,060,867 A * | 10/1991 | Luxton | ................ | B01F 5/0415 239/428.5 |
| 5,423,675 A * | 6/1995 | Kratsch | ................ | F23D 14/02 431/328 |
| 6,026,801 A * | 2/2000 | Barkan | ................ | F24H 1/43 122/406.1 |
| 6,918,757 B2 * | 7/2005 | Nakamura | ............. | F23C 6/045 431/171 |
| 7,004,749 B2 * | 2/2006 | Asano | ................ | F23C 6/045 431/18 |
| 8,827,694 B2 * | 9/2014 | Marutani | ................ | F23C 6/04 431/159 |
| 2004/0170937 A1* | 9/2004 | Asano | ................ | F23C 6/045 431/18 |
| 2007/0272201 A1* | 11/2007 | Amano | ................ | F23C 6/045 123/295 |
| 2011/0223549 A1* | 9/2011 | Cantu | ................ | F23C 6/04 431/89 |

FOREIGN PATENT DOCUMENTS

| | | |
|---|---|---|
| EP | 2366952 | 9/2011 |
| JP | 63029135 Y2 * | 8/1988 |

OTHER PUBLICATIONS

International Search Report of Mexico Application No. PCT/MX2013/000061 dated Sep. 4, 2013—4 pages.
English translation of the Written Opinion of Mexico Application No. PCT/MX2013/000061 dated Sep. 4, 2013—7 pages.

* cited by examiner

GASEOUS FUEL BURNER WITH HIGH ENERGY AND COMBUSTION EFFICIENCY, LOW POLLUTANT EMISSION AND INCREASED HEAT TRANSFER

CROSS REFERENCE TO RELATED APPLICATIONS

The present application is a National Stage of International Application No. PCT/MX2013/000061, filed on May 14, 2013, which claims priority to Mexican Application No. MX/a/2012/006599, filed on Jun. 8, 2012, the entire contents of which are being incorporated herein by reference.

FIELD OF THE INVENTION

The invention relates to an innovative gaseous fuel burner structure (including all mixtures thereof), which produces a highly turbulent mix between the gaseous fuel (including all mixtures thereof) and the oxidant, which has a high energy efficiency, low pollutant emissions and generates turbulent kinetic energy, which makes the combustion process more efficient and generates a greater heat transference which allows heating a bigger air mass at higher temperatures.

BACKGROUND OF THE INVENTION

Generally all the gaseous fuel burners and all their mixtures (e.g. natural gas, LP gas, hydrogen, etc.) have the same application, that is to burn a gaseous fuel (including all mixtures thereof) to generate heat. However most show low energy efficiency since the combustion processes are low efficient and consume high quantities of fuel, combined with high pollutant emissions of NOx, CO and $CO_2$.

Moreover conventional burners perform the combustion process outside the burner which lowers their efficiency in the heat transfer process. The general structural configuration of this burners produces a mix of the gaseous fuel (including all mixtures thereof) and the oxidant in a laminar flow or hardly reaching the turbulent flow, which is not sufficient to excite the gas flow to liberate its maximum energy.

A search of precedents to establish the state of the art found the the international patent application No. WO2008007016 by De Smedt Guillaume submitted on Jul. 10, 2007 which claims the French priority FR0652974 of Jul. 13, 2006, which has been submitted in Mexico and granted the number MX297397. That patent protects a combustion method for a fuel using an oxidant and at least one mainly inert gas, whereby the fuel and oxidant are injected in such way it produces a flame. The inert gas is mainly injected in the form of two nozzles in such way that the first nozzle surrounds the flame created by the fuel and the oxidant and has a divergent swirl in respect to the flame; the second nozzle surrounds the first nozzle with inert gas mainly and has a convergent swirl in respect to the flame created by the fuel and the oxidant. The invention also relates to a suitable burner to implement the method. The burner features at least one means to inject fuel and at least one means to inject the oxidant in such fashion they produce a flame; two means to inject inert gas, the first means injects part of the inert gas in the form of a nozzle that surrounds the flame produced by the oxidant and the fuel and consists of a suitable means to produce a divergent swirl of the inert gas flow which mainly passes through it; the second means to inject inert gas in the form of a nozzle which surrounds the inert gas nozzle of the first medium to inject inert gas and the second medium to inject inert gas consists of a suitable medium to produce a convergent swirl of the inert gas flow which passes through it.

However this burner is configured to generate a first combustion of a mixture of a gaseous fuel with an oxidant (air) and re-inject residual gas produced by the combustion to compensate for the absence of nitrogen. Although it prevents a high production of NOx, the configuration and geometric arrangement of the burner is such that it does not allow a more efficient combustion which translates to a higher energy efficiency, in addition the low injection speed of residual gas used increases the size of the boiler and poses greater safety issues.

The search also found the American patent application US2007/0072141 by Marco Daneri et al. which discloses a low pollutant emission gas burner which consists of a metallic main body (6), an inner lancet (11) for gas fuel, at least two outer lancets (10) for gas fuel, an individual duct (8) to transport preheated air, a regulation system for the gas fuel, a refractory unit (30), characterized by a gas nozzle (1) which consists of a series of nozzles (20) to inject the preheated air in the combustion chamber in which, when operating the gas regulation system, it is possible to change with continuity, from an operational mode of the burner with flame to flame-less operational mode, the latter characterized by low emissions of contaminant agents.

However said burner does not feature a structure or geometric arrangement which allows neither a more efficient combustion process, nor good energy efficiency; moreover it requires the injection of preheated air.

The search also found the American patent US6638058B1 by Sebastian Mainush et al. granted on Oct. 28, 2013, which protects a tubular burner for industrial ovens which consists of: An inner final section protruding in a combustion zone of the oven supplied with secondary combustion air; a variety of radially arranged tubular walls separated from each other and coaxially one inside the other, which limit a variety of separate, cross-section, approximately annular supply ducts for combustion gas and fuel; in which the front end, pointed towards the combustion zone of at least a supply duct essentially built to supply a combustion gas, is fitted with a number of individual nozzles distributed approximately in annular arrangement; wherein, in cross-section view from the final section of the inner burner, at least one outer annular supply duct is built essentially as a fuel supply duct and the gas supply duct fitted with the individual nozzles is placed radially within this fuel supply conduct.

However, the structural configuration and geometric arrangement of the burner prevents offering the characteristics and benefits provided by the gaseous fuel burner (including all mixtures thereof) of the invention.

The search also found the patent US778510081 of Malcolm Swanson and Michael Swanson of May 26, 2006, and granted on May 26, 2006 and on Aug. 31, 2010, which protects a burner assembly which includes a housing with an air inlet and burner end, an engine and a driver mounted in the housing. The driver is in fluid communication with the air inlet, in mechanic communication with the engine and adapted to direct the air from the air inlet towards the end of the burner of the housing. The assembly of the burner also includes a variety of gas injection pipes arranged substantially parallel amongst themselves. Each one of the variety of gas injection pipes includes an opening at the end of the pipe, an end of the outlet pipe and at least one opening. Moreover, the assembly of the burner includes a first layer of pipes arranged close to the inlet ends of the variety of gas injection pipes and a second layer of pipes arranged close to the outlet ends of the variety of injection gas pipes. The assembly of the burner includes also a turning fin with at least a layer of centrifuge pallets. The turning fin is mounted in the end of the burner of the housing and is adapted to direct the air flow in the end of the burner. The arrangement of the burner also includes an igniter mounted in the end of the burner of the house. The igniter is adapted to ignite the mixture of air and fuel in the end of the burner of the housing to produce the main flame.

However, the structural configuration and geometric arrangement of the burner also do not offer the benefits provided by the gaseous fuel burner (including all mixtures thereof) of the invention; moreover it shows that the flame is generated in the end part outside the burner.

The stoichiometric ratio of air-methane is 17:1 in mass. Since methane is 90% of the composition of natural gas, we can state that the majority of the conventional burners employ a methane-air ratio of 19:1 in mass; considering an excess of air of 15%. This ratios do not achieve fuel savings and the heated air mass is reduced; moreover the levels of pollutant emissions to the atmosphere are very high.

The need to improve the efficiency in the oxidation of fossil fuels becomes more and more important each day, since the energy costs increase while the natural reservoirs diminish; besides the alarming current environmental conditions. In view of the situation, the gaseous fuel burner (including all mixtures thereof) with high energy and combustion efficiency, low pollutant emissions and greater heat transfer which allows to heat a bigger air mass at higher temperatures has been developed.

Objectives of the Invention

The main objective of the invention is to make available a gaseous fuel burner (including all mixtures thereof) which allows generating a highly turbulent mix between the fuel and the oxidant which allows to maximize the heat transfer and improve the combustion process to heat a bigger air mass, which translates to greater fuel savings and an important reduction of the emission of pollutant gases.

Other objective of the invention is to allow said gaseous fuel burner (including all mixtures thereof) of high energy and combustion efficiency and greater heat transfer as well, which also improves the heat transfer thus reducing the consumption of fuel up to 50% of what is normally used in conventional burners.

Other objective of the invention is to allow said gaseous fuel burner (including all mixtures thereof) of high energy and combustion efficiency and greater heat transfer as well, which allows reducing greenhouse gases emission up to 60% and reaching a category of low NOx emissions and therefore reach environmental protection standards required by law.

Other objective of the invention is to allow said gaseous fuel burner (including all mixtures thereof) of high energy and combustion efficiency and greater heat transfer as well, which also allows to begin the combustion within the burner itself to benefit the heat transfer, since starting the hearth maximum temperatures are reached.

Other objective of the invention is to allow said gaseous fuel burner (including all mixtures thereof) of high energy and combustion efficiency and greater heat transfer as well, which can also operate at laminar flows of fuel and oxidant supply, that is, with Mach values under 0.05, Reynolds values under 3,000 and speeds under 10 m/s.

Other objective of the invention is to allow said gaseous fuel burner (including all mixtures thereof) of high energy and combustion efficiency and greater heat transfer as well, which is easy to assemble, with a simple, practical and functional structure in both operation and handling.

Other objective of the invention is to allow said gaseous fuel burner (including all mixtures thereof) of high energy and combustion efficiency and greater heat transfer as well, which also allows a more efficient combustion of the fuel by adding a bigger air mass and heating completely this excess mass.

And all the characteristics and objectives shall become apparent when performing a general and detailed description of the invention supported by the illustrated embodiments.

BRIEF DESCRIPTION OF THE INVENTION

In general the gaseous fuel burner (including all mixtures thereof) with high energy and combustion efficiency, low pollutant emissions and greater heat transfer, pursuant to the invention, consists of an outer housing which define a distal outlet end for the flame and a proximal supply end for the gaseous fuel (including all mixtures thereof) and the oxidant (air); both ends having covers; a pressurized air inlet is placed in the wall near the proximal end in whose interior are placed deflectors which allow the uniform distribution of air in the interior of the housing and which define a perimeter chamber for pressurized air supply which functions as insulation for the housing and prevents high temperatures in its surface, such as the generated in the mixing chambers and over-mixing.

The cover of the proximal end is adapted to receive affixed in the center a pressurized gaseous fuel supply duct (including all mixtures thereof) from a gaseous fuel supply source (including all mixtures thereof), which consists internally of a turbulence generating element placed transversally which helps the aforementioned gaseous fuel reach a turbulent flow (including all mixtures thereof); an end portion of said gaseous fuel supply duct (including all mixtures thereof) housed in the interior of a first mixing chamber housed in the interior of said housing, which consists in a cover in its proximal end through which said gaseous fuel supply duct (including all mixtures thereof) is connected and is open in its distal end; said end portion of said gaseous fuel supply duct (including all mixtures thereof) is housed in the interior of said first mixing chamber which includes a variety of orifices in its wall for the outlet of the gaseous fuel (including all mixtures thereof) towards said first mixing chamber. Said cover of the proximal end of said first mixing chamber, as well as its wall, include a variety of orifices to supply pressurized air both radially axially and radially from said pressurized air supply perimeter chamber, to generate a first turbulent enriched mixture of gaseous fuel (including all mixtures thereof) and air in said first mixing chamber; an igniter element is placed in the proximal zone of said first mixing chamber to generate a first stage of the combustion process.

In one of the embodiments of the invention, said turbulence generator element which is placed transversally in said gaseous fuel supply duct (including all mixtures thereof), may be of cylindrical or of multi-faceted shape, either regular or irregular.

In other of the embodiments of the invention, said orifices both of the gaseous fuel supply duct (including all mixtures thereof) and of the wall of said first mixing chamber may have different shapes and sizes and be arranged in columns of equal or different number, at equal distance between each other or not, as well as in interspersed, offset or diagonal arrangements.

The arrangement of said orifices of the cover of the proximal end of said mixing chamber through which pressurized air is supplied axially may be circular or polygonal, either regular or irregular or without a defined pattern.

In other of the embodiments of the invention the orifices of said gaseous fuel pressurized supply duct (including all mixtures thereof) through which fuel is supplied to the first mixing chamber, are offset in relation to the orifices of the wall of said first mixing chamber through which the pressurized air is supplied from the pressurized air supply perimeter chamber, to generate the maximum shearing force between both flows and achieve a better mixing.

A second over-mixing open chamber open in both ends, coupled collinearly with said first mixing chamber housed within said housing, where the end of said gaseous fuel supply duct (including all mixtures thereof) is placed centrally to the limit of the border between said first mixing chamber and said second over-mixing chamber; the end of said gaseous fuel supply duct (including all mixtures thereof) consists of an obstruction cover with a variety of orifices through which a turbulent flow of gaseous fuel (including all mixtures thereof) is supplied axially towards said second over-mixing chamber and the wall of said second over-mixing chamber consists of a variety of orifices through which pressurized air is supplied radially from said pressurized air supply perimeter chamber to generate a second enriched, turbulent gaseous fuel (including all mixtures thereof)—air mixture and where a second stage of the combustion process takes place.

The end portion of said gaseous fuel supply duct (including all mixtures thereof) has the shape of a funnel and is fitted with said obstruction cover with a variety of orifices through which a turbulent flow of gaseous fuel (including all mixtures thereof) is supplied axially towards said second over-mixing chamber.

Both mixing and over-mixing chambers have a particular arrangement of orifices which favor a highly turbulent mixture, as well as the complete oxidation of the fuel.

Said orifices of the wall of said second over-mixing chamber may have different shapes and sizes and be arranged in columns of equal or different number, at equal distance between each other or not; as well as in interspersed, offset or diagonal arrangements.

In said orifices of the wall of said second over-mixing chamber through which pressurized air is supplied from said pressurized air supply perimeter chamber defined by the housing, may be present speeds higher and lower than 10 m/s or Reynolds numbers higher or lower than 3,000 in laminar and turbulent flows, respectively; reaching a better performance in turbulent flow.

The cover of the distal end of said housing includes a central opening in which the second over-mixing chamber, where the flame is generated, leads into.

In one of the embodiments of the invention, a third conic chamber for the generation of the flame is placed collinearly connected on the end of said second over-mixing chamber, which provides the flame an adequate form to maximize the heat transfer. In this embodiment the housing may extend to cover the outer end portion for said third chamber for the generation of the flame.

Said third conic chamber for the generation of the flame consists of a wall with an angle between 7 and 9°.

Said third conic chamber for the generation of the flame is provided with an adequate form to maximize the heat transfer, and although it operates in laminar flow, due to the geometric arrangement of the mixing and over-mixing chambers, a turbulent flow is reached in said third conic chamber with speeds over 30 m/s and Reynolds numbers much greater than 30,000, reaching values in the order of 1,000,000 when the burner operates at full load.

The burner as it has been described in its structural configuration and geometric arrangement allows savings of gaseous fuel (including all mixtures thereof) and a reduction of pollutant gases generated by the combustion process. Said burner handles excess air in the order of 135%; the turbulent mixing generated by the burner allows to heat the excess air.

The stoichiometric ratio of air-methane is 17:1 in mass. Our burner uses 135% of excess air, equivalent to a 40:1 ratio in mass for methane.

$$CH_4 + 2\left(O_2 + \frac{79}{21}N_2\right) \rightarrow CO_2 + 2H_2O + 2 \times 3.76 N_2$$

16 kg $CH_4$ + 64 kg $O_2$ + 210.6 kg $N_2 \rightarrow$ 44 kg $CO_2$ + 36 kg $H_2O$ + 210.6 kg $N_2$ $$RE_m = \frac{2(32 + 105.3)}{1 \times 16} = 17.16$$

$$CH_4 + 2\left(O_2 + \frac{79}{21}N_2\right) \rightarrow CO_2 + 2H_2O + 2 \times 3.76 N_2$$

16 kg $CH_4$ + 64 kg $O_2$ + 210.6 kg $N_2 \rightarrow$ 44 kg $CO_2$ + 36 kg $H_2O$ + 210.6 kg $N_2$ $$RE_m = \frac{2(32 + 105.3)}{1 \times 16} = 17.16$$

$$CH_4 + 2\left(O_2 + \frac{79}{21}N_2\right) \rightarrow CO_2 + 2H_2O + 2 \times 3.76 N_2$$

16 kg $CH_4$ + 64 kg $O_2$ + 210.6 kg $N_2 \rightarrow$ 44 kg $CO_2$ + 36 kg $H_2O$ + 210.6 kg $N_2$ $$RE_m = \frac{2(32 + 105.3)}{1 \times 16} = 17.16$$

Using 135% of excess air keeping in balance the total mass of the system allows to reduce the fuel consumption up to 50%. The total mass of the system is determined starting from the original power, with the excess air used in conventional technology and the stoichiometric ratio in the gaseous air-fuel mass.

$$\dot{m}_g = \frac{\dot{W}}{PC_i}$$

$$\dot{m}_a = \dot{m}_g\left[1 + \frac{\% \, Exceso}{100}\right]RE_m$$

$$\dot{m}_T = \dot{m}_g + \dot{m}_a$$

$$\dot{m}_g = \frac{\dot{W}}{PC_i}$$

$$\dot{m}_a = \dot{m}_g\left[1 + \frac{\% \, Exceso}{100}\right]RE_m$$

$$\dot{m}_T = \dot{m}_g + \dot{m}_a$$

$$\dot{m}_g = \frac{\dot{W}}{PC_i}$$

$$\dot{m}_a = \dot{m}_g\left[1 + \frac{\% \, Exceso}{100}\right]RE_m$$

$$\dot{m}_T = \dot{m}_g + \dot{m}_a$$

Although the burner performs better in turbulent flow, it also improves the efficiency in the combustion process in laminar flow of the supply of gaseous fuel (including all mixtures thereof) and air.

In the orifices of the wall of the mixing chamber through which pressurized air is injected radially from the pressurized air supply perimeter chamber defined by the housing, may be present speeds higher and lower than 10 m/s or Reynolds numbers higher or lower than 3,000 in laminar and turbulent flows, respectively; reaching a better performance in turbulent flow.

The structural configuration and geometric arrangement of the burner allows up to 50% of gaseous fuel (including all mixtures thereof) savings, and reduces green house gases emissions up to 60% and reach a category of low NOx emissions. Other of the advantages of the burner is the combustion process which begins inside the burner itself from the mixing chamber, in the over-mixing chamber and up to the flame generation chamber; this favors the heat transfer process, because maximum temperatures are reached from the beginning.

The geometry, arrangement and structural configuration of the burner allows to have high speeds which produce a complete combustion and makes the heat transfer more efficient.

The burner of the invention performs the combustion process within the burner itself. The combustion is performed in the first mixing chamber, in the second over-mixing chamber and in the flame generation chamber the fuel is finally burned completely.

With computer analysis it has been demonstrated that even with 135% of excess air, flame temperatures surpass 1800° C. when heating this excess air mass.

The burner may be used in smoke pipe boilers, water pipe boilers, steam generators, process heaters, temper furnaces, glass furnaces, steel furnaces, ceramic furnaces, clinkering furnaces, thermal treatments, to supply gas turbines, in domestic applications such as water heaters and stoves, etc.

To better understand the characteristics of the invention, attached to this description, as an integral part thereof, are drawings for illustration purposes only, and without limitation, which describe the preferred embodiment as follows.

For a better understanding of the invention, we proceed to the detailed description of some embodiments thereof, shown in the drawings for illustrative purposes without limitation, attached to the description.

DETAILED DESCRIPTION OF THE INVENTION

The characteristic details of the gaseous fuel burner (including all mixtures thereof) with high energy and combustion efficiency, low pollutant emissions and greater heat transfer are clearly shown in the following description and in the attached illustrative drawings, which serve as reference highlight the same parts.

Figure 1:
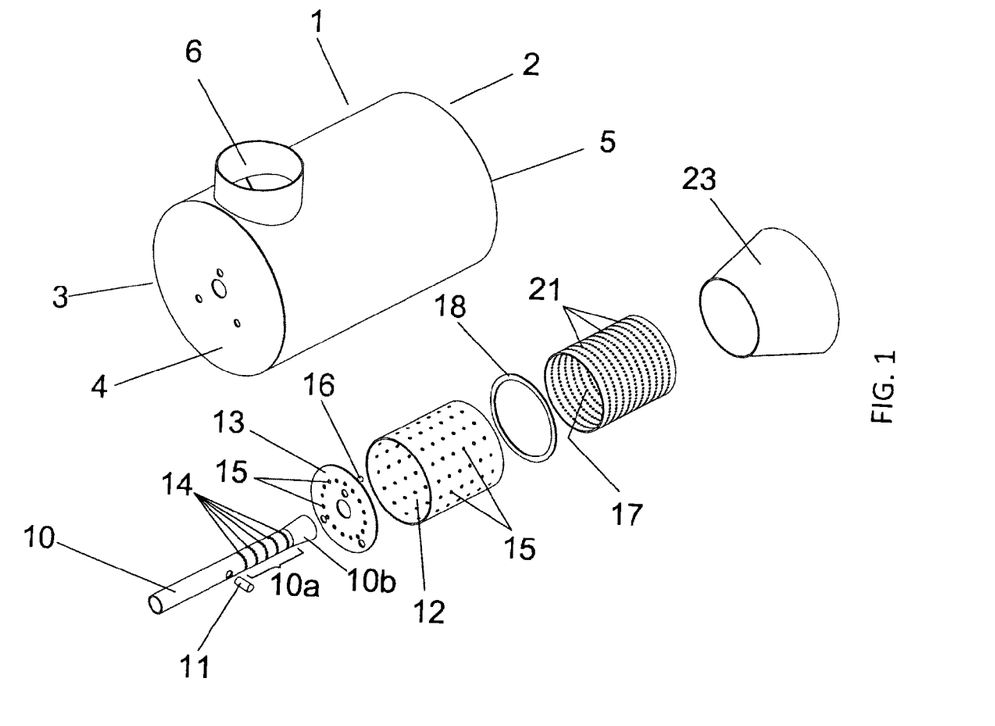
FIG. 1 shows an exploded view of the gaseous fuel burner (including all mixtures thereof) with high energy efficiency, low pollutant emissions and greater heat transfer, with the teachings of the invention.
Figure 2:
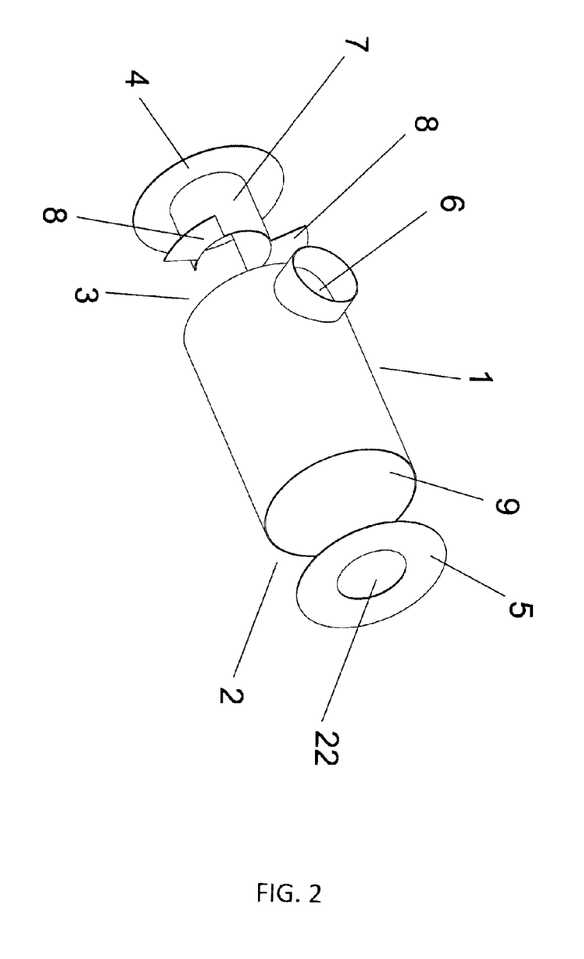
FIG. 2 shows an exploded view of the housing of the gaseous fuel burner (including all mixtures thereof) pursuant to FIG. 1 which shows the teachings of the invention.
Figure 3:
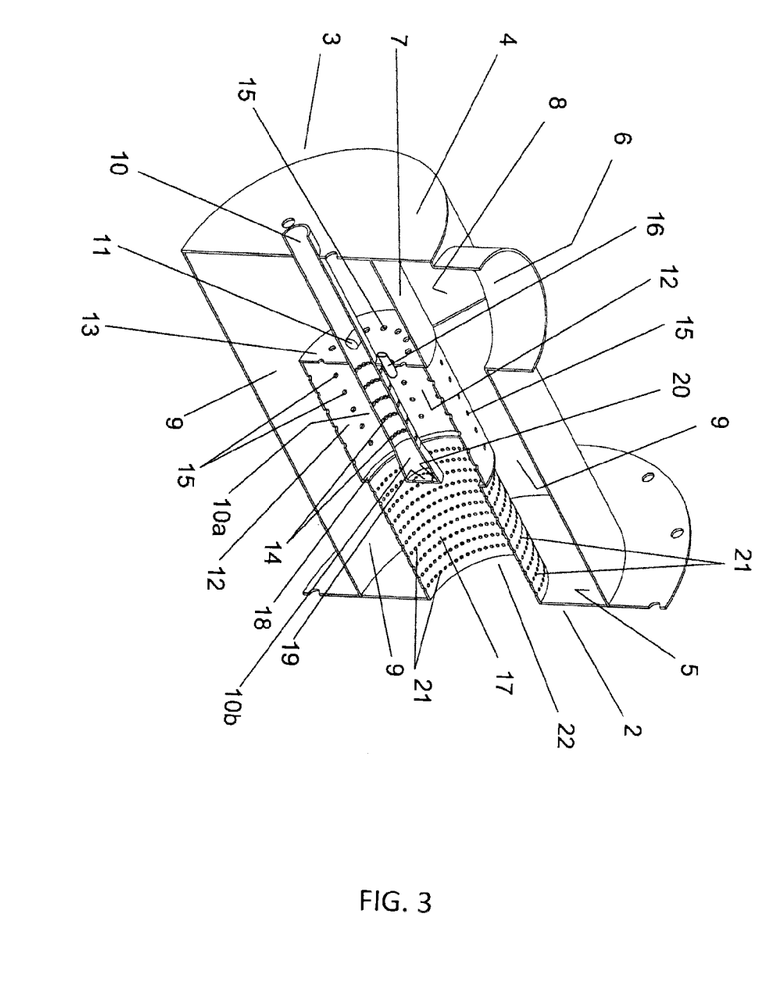
FIG. 3 shows a perspective longitudinal cross-section of the gaseous fuel burner (including all mixtures thereof) without the end chamber for flame generation, with the teachings of the invention.
Figure 4:
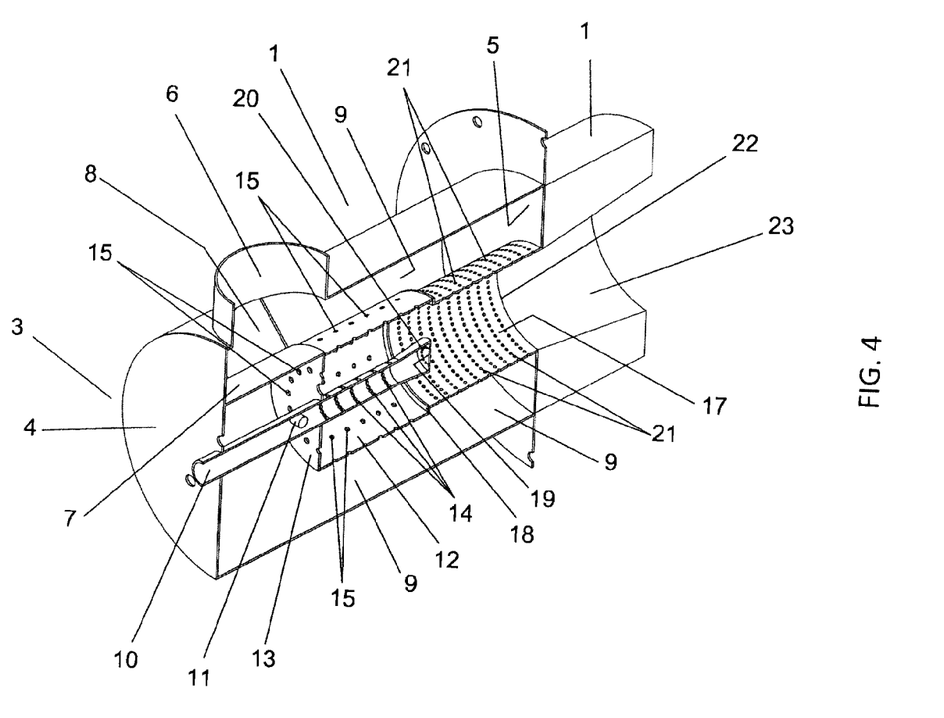
FIG. 4 shows a perspective longitudinal cross-section of the gaseous fuel burner (including all their mixtures thereof) incorporating the end chamber for flame generation, with the teachings of the invention.

Making reference to FIGS. 1 and 4, the burner consists of an outer housing 1 which defines a distal end 2 of outlet for the flame and a proximal end 3 of supply of the gaseous fuel (including all mixtures thereof) and oxidant (air); both ends having covers 4 and 5; a pressurized air inlet 6 is placed radially on the wall of the housing close to the proximal end 3, in which interior a concave deflector 7 is placed in the zone of the inlet of pressurized air 6 and is attached in said cover 4 of the proximal end 3; at least two deflector plates 8 separated between each other and radially fixed on the inner wall of said housing 1 and in said concave deflector 7; said deflectors allow a uniform distribution of the air in the interior of the housing 1, defining a pressurized air supply perimeter chamber 9.

The cover 4 of the proximal end 3 is adapted to receive affixed in the center a pressurized gaseous fuel supply duct 10 (including all mixtures thereof) from a gaseous fuel supply source (including all mixtures thereof), which consists internally of a substantially cylindrical turbulence generating element 11 placed transversally which helps said gaseous fuel reach a turbulent flow (including all mixtures thereof); an end portion 10a of said gaseous fuel supply duct (including all mixtures thereof) housed in the interior of a first mixing chamber 12 housed in the interior of said housing 1, which consists in a cover 13 in its proximal end fixed to the concave deflector 7 through which said gaseous fuel supply duct 10 (including all mixtures thereof) is centrally connected and is open in its distal end; said end portion 10a of said gaseous fuel supply duct (including all mixtures thereof) is housed in the interior of said first mixing chamber 12 which includes a variety of orifices 14 in its wall for the outlet of the gaseous fuel (including all mixtures thereof) towards said first mixing chamber 12.

Said cover 13 of the proximal end of said first mixing chamber 12, as well as its wall, include a variety of orifices 15 to supply pressurized air both radially axially and radially from said pressurized air supply perimeter chamber 9, to generate a first turbulent enriched mixture of gaseous fuel (including all mixtures thereof) and air in said first mixing chamber 12; an igniter element is placed in the proximal zone of said first mixing chamber 12 to generate a first stage of the combustion process in said first chamber.

The orifices 14 of said gaseous fuel pressurized supply duct 10 (including all mixtures thereof) through which fuel is supplied to the first mixing chamber 12, are offset in relation to the orifices 15 of the wall of said first mixing chamber 12 through which the pressurized air is supplied from the pressurized air supply perimeter chamber 9, to generate the maximum shearing force between both flows and achieve a better mixing.

A second over-mixing open chamber 17 open in both ends, coupled collinearly with said first mixing chamber 12 through a coupling ring 18 staying housed within said housing 1, where the end of said gaseous fuel supply duct (including all mixtures thereof) is placed centrally to the limit of the border between said first mixing chamber 12 and said second over-mixing chamber 17; the distal end of said gaseous fuel supply duct 10 (including all mixtures thereof) consists of a cone 10b which ends at the obstruction cover 19 with a variety of orifices 20 through which a turbulent flow of gaseous fuel (including all mixtures thereof) is supplied axially towards said second over-mixing chamber 17 and the wall of said second over-mixing chamber 17 consists of a variety of orifices 21 through which pressurized air is supplied radially from said pressurized air supply perimeter chamber 9 to generate a second enriched, turbulent gaseous fuel (including all mixtures thereof)—air mixture and where a second stage of the combustion process takes place.

The dimensions of the second over-mixing chamber 17 are smaller compared with the first mixing chamber 12.

Both mixing 12 and over-mixing 17 chambers have a particular arrangement of orifices which favor a highly turbulent mixture, as well as the complete oxidation of the fuel.

The cover 5 of the distal end of said housing 1 includes a central opening 22 in which the second over-mixing chamber 17, where the flame is generated, leads into.

A third conic chamber for the generation of the flame 23 open at both ends (which is formed by the extension of the housing and a ceramic insulation conic body) is placed collinearly connected on the end of said second over-mixing chamber 17, which provides the flame an adequate form to maximize the heat transfer. The housing 1 may extend to cover the outer end portion for said third chamber for the generation of the flame 23.

Figure 5:
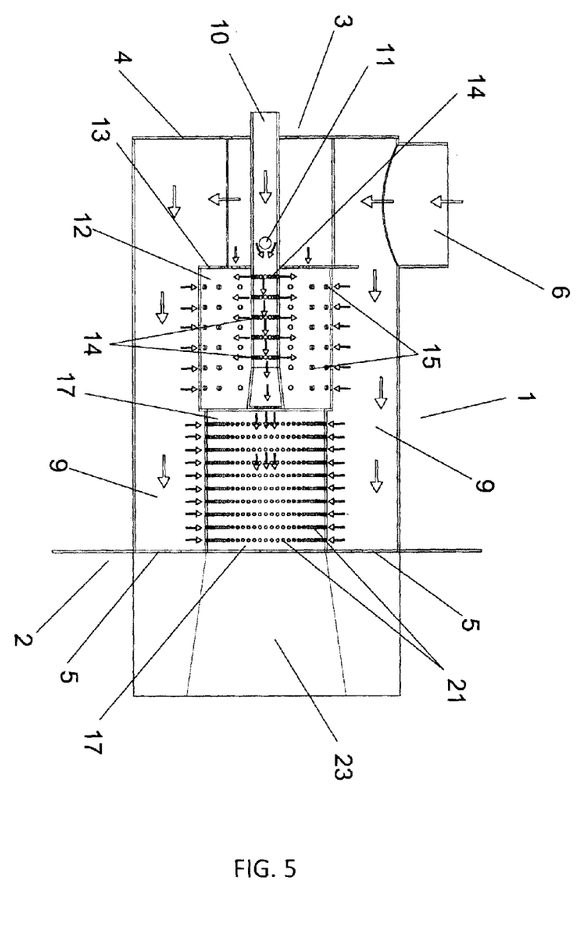
FIG. 5 shows a cross-section of the gaseous fuel burner (including all mixtures thereof), completely assembled with the teachings of the invention.

With reference to FIG. 5, it shows the different components of the burner in a longitudinal cross-section, illustrating the structural disposition and geometric arrangement in which the same numeric references for the same components that offer the benefits described above are expressed. This figure shows the gaseous fuel-air flow (including all mixtures thereof) to the first mixing chamber 12 and to the second over-mixing second chamber 17 and the passage of the flame generated by the combustion in the third chamber for flame generation 23, which provides the flame an adequate form to maximize heat transfer.

Figure 6:
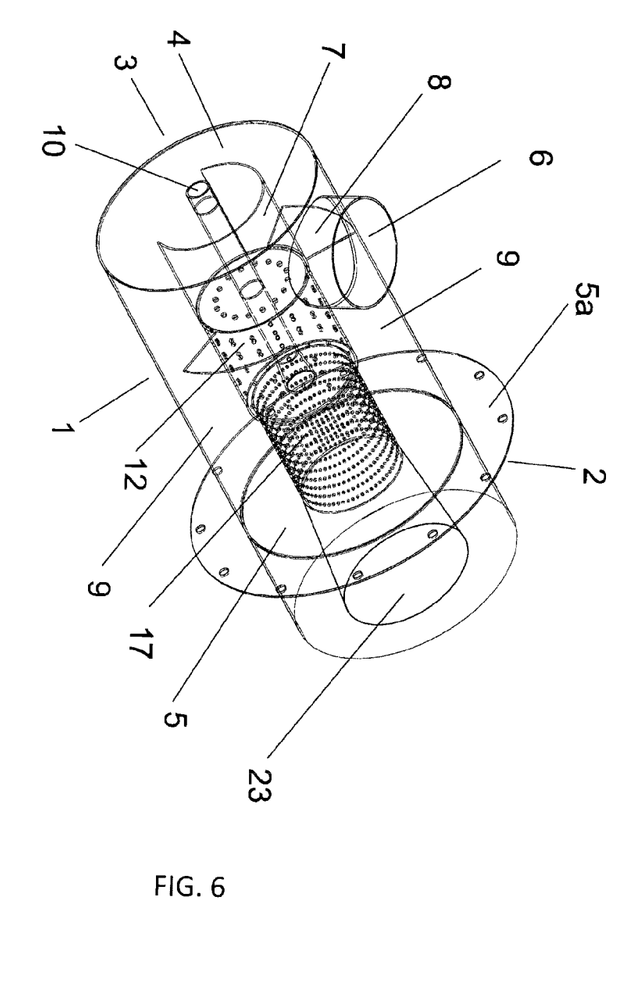
FIG. 6 illustrates an isometric view of the gaseous fuel burner (including all mixtures thereof) pursuant to the invention, showing the inner chambers.

In FIG. 6 shown, the same numerical references used to refer to the same components of the gaseous fuel burner (including all mixtures thereof) with the teachings of the invention are indicated. Additionally it is shown that said housing 1 includes also a flange 5a in the zone where the cover 5 of the distal end is affixed, to set the burner in a required zone.

This invention has been sufficiently described so a person with moderate knowledge in the art can reproduce and obtain the results outlined in this specification. Any person skilled in the technical field of this invention will be able to carry out modifications not outlined in this application, however, if the subject matter of the following claims is needed to perform these modifications in a determined structure or in the manufacture process thereof, said structures will be included in the scope of the invention.

Having sufficiently described the invention, the contents in the following clauses is claimed as proprietary:

1. A gaseous fuel burner with high energy and combustion efficiency, low pollutant emissions and greater heat transfer, comprising:
    an outer housing which defines a distal end for an outlet of a flame, the outer housing further comprising a proximal end for a supply of gaseous fuel and air;
    a first cover on the proximal end of the outer housing;
    a second cover of the distal end of the outer housing;
    a pressurized air inlet on a wall of the outer housing, the pressurized air inlet is closer to the proximal end of the outer housing than the distal end of the outer housing;
    a first mixing chamber inside the outer housing, and a proximal portion of an inner pressurized air supply chamber is defined between the first mixing chamber and the outer housing;
    a pressurized gaseous fuel supply duct affixed on a center of the first cover, the pressurized gaseous fuel supply duct comprising an end portion housed inside the first mixing chamber, the first mixing chamber comprises a third cover on a proximal end of the first mixing chamber, the pressurized gaseous fuel supply duct extends through the third cover, and the first mixing chamber is open in a distal end of the first mixing chamber, the end portion of the pressurized gaseous fuel supply fuel duct includes a first plurality of orifices in a wall of the end portion for an outlet of the gaseous fuel into the first mixing chamber;
    the third cover of the proximal end of the first mixing chamber, as well as a wall of the first mixing chamber, include a second plurality of orifices to supply pressurized air axially and radially from the proximal portion of the inner pressurized air supply chamber into the first mixing chamber to generate a first turbulent mixture of gaseous fuel and air inside the first mixing chamber;
    an igniter element inside the first mixing chamber to generate a first stage of a combustion process;
    a second mixing chamber comprising an open distal end and an open proximal end and coupled collinearly with the first mixing chamber housed within the outer housing, wherein the end portion of the pressurized gaseous fuel supply duct is placed centrally to a periphery of a border between the first mixing chamber and the second mixing chamber; and
    deflectors inside the outer housing and aligned with the pressurized air inlet, the deflectors comprise a concave deflector placed in an inlet zone of pressurized air from the pressurized air inlet, the concave deflector affixed to the first cover of the proximal end of the outer housing, the deflectors further comprise at least two deflector plates separated between each other and affixed radially in an inner wall of the outer housing and on the concave deflector, the deflectors are distributed and arranged to uniformly distribute a homogeneous flow of air in all of an interior of the inner pressurized air supply chamber;
    the distal end of the gaseous fuel supply duct comprises a fourth cover with a third plurality of orifices through which a turbulent flow of gaseous fuel is supplied axially into the second mixing chamber, and a wall of the second mixing chamber comprises a fourth plurality of orifices through which pressurized air is supplied radially from the inner pressurized air supply perimeter chamber into the second mixing chamber to generate a second enriched, turbulent mixture of gaseous fuel and air and where a second stage of the combustion process occurs;
    the second cover of the distal end of the outer housing comprises a central opening into which the second mixing chamber leads.

2. The gaseous fuel burner with high energy and combustion efficiency, low pollutant emissions and greater heat transfer, pursuant to claim 1, comprising a third chamber for generation of the flame, the third chamber is conic and is collinearly connected on the distal end of the second mixing chamber, and the third chamber provides the flame an adequate form to maximize the heat transfer.

3. The gaseous fuel burner with high energy and combustion efficiency, low pollutant emissions and greater heat transfer, pursuant to claim 2, wherein the third chamber for the generation of the flame comprises a wall with an angle between 7 and 9°.

4. The gaseous fuel burner with high energy and combustion efficiency, low pollutant emissions and greater heat transfer, pursuant to claim 1, wherein the pressurized gaseous fuel supply duct is pressurized from a gaseous fuel supply source and comprises an interior of a turbulence generator element placed transversally which helps the gaseous fuel reach a turbulent flow.

5. The gaseous fuel burner with high energy and combustion efficiency, low pollutant emissions and greater heat transfer, pursuant to claim 4, wherein the turbulence generator element which is placed transversally in the pressurized gaseous fuel supply duct is of cylindrical shape.

6. The gaseous fuel burner with high energy and combustion efficiency, low pollutant emissions and greater heat transfer, pursuant to claim 1, wherein the distal end of the first mixing chamber is affixed in the concave deflector to remain centered within the outer housing.

7. The gaseous fuel burner with high energy and combustion efficiency, low pollutant emissions and greater heat transfer, pursuant to claim 1, wherein the first plurality of orifices of the gaseous fuel pressurized supply duct through which fuel is supplied to the first mixing chamber are offset in relation to the second plurality of orifices of the wall of the first mixing chamber through which the pressurized air is supplied from the pressurized air supply perimeter chamber, to generate shearing forces between a flow from the first plurality of orifices and a flow from the second plurality of orifices and achieve a better mixing thereof.

8. The gaseous fuel burner with high energy and combustion efficiency, low pollutant emissions and greater heat transfer, pursuant to claim 1, wherein the first plurality of orifices of the pressurized gaseous fuel supply duct have at least one of a different shape or a different size relative to the second plurality of orifices of the wall of the first mixing chamber.

9. The gaseous fuel burner with high energy and combustion efficiency, low pollutant emissions and greater heat transfer, pursuant to claim 1, wherein the second plurality of orifices of the third cover of the proximal end of the first mixing chamber through which pressurized air is supplied axially have a circular configuration.

10. The gaseous fuel burner with high energy and combustion efficiency, low pollutant emissions and greater heat transfer, pursuant to claim 1, wherein the fourth plurality of orifices of the wall of the second mixing chamber have at least one of a different shape or a different size relative to the second plurality of orifices of the wall of the first mixing chamber.

11. The gaseous fuel burner with high energy and combustion efficiency, low pollutant emissions and greater heat transfer, pursuant to claim 1, wherein the second mixing chamber is coupled collinearly with the first mixing chamber through a coupling ring and housed within the outer housing; the second mixing chamber is smaller than the first mixing chamber; and a distal portion of the inner pressurized air supply chamber is defined between the second mixing chamber and the outer housing.

12. The gaseous fuel burner with high energy and combustion efficiency, low pollutant emissions and greater heat transfer, pursuant to claim 1, wherein the end portion of the pressurized gaseous fuel supply duct has a funnel shape and is fitted with the fourth cover with the third plurality of orifices through which a turbulent flow of gaseous fuel is supplied axially into the second mixing chamber.

* * * * *